(12) United States Patent
Harada (10) Patent No.: US 7,489,056 B2
(45) Date of Patent: Feb. 10, 2009

(54) METHOD OF BONDING METALLIC MEMBERS BY PLASTIC-FLOW BONDING AND PLASTIC-FLOW BONDED BODY

(75) Inventor: Kouji Harada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/677,291

(22) Filed: Oct. 3, 2003

(65) Prior Publication Data
US 2004/0071504 A1    Apr. 15, 2004

(30) Foreign Application Priority Data
Oct. 4, 2002   (JP)   ............... 2002-292794

(51) Int. Cl.
   *H02K 37/00*   (2006.01)
   *G11B 17/00*   (2006.01)
(52) U.S. Cl. .............. 310/40 R; 29/522.1; 29/598; 360/99.08; 369/266; 720/695
(58) Field of Classification Search ................ None
   See application file for complete search history.

(56) References Cited

U.S. PATENT DOCUMENTS

| | | | | |
|---|---|---|---|---|
| 4,377,762 | A * | 3/1983 | Tatsumi et al. | 310/42 |
| 4,413,717 | A * | 11/1983 | Kanamaru et al. | 192/84.961 |
| 5,315,465 | A * | 5/1994 | Blanks | 360/265.6 |
| 5,559,382 | A * | 9/1996 | Oku et al. | 310/90 |
| 5,663,602 | A * | 9/1997 | Shimizu et al. | 310/67 R |
| 5,951,890 | A * | 9/1999 | Beuch et al. | 219/121.64 |
| 6,274,955 | B1 * | 8/2001 | Satoh et al. | 310/71 |
| 6,501,617 | B1 * | 12/2002 | Harada et al. | 360/99.08 |
| 6,506,034 | B1 * | 1/2003 | Lentz et al. | 417/423.8 |
| 6,556,374 | B1 * | 4/2003 | Satoh et al. | 360/99.08 |
| 6,753,636 | B2 * | 6/2004 | Rehm et al. | 310/258 |
| 2004/0154036 | A1 * | 8/2004 | Saito | 720/697 |

FOREIGN PATENT DOCUMENTS

| | | |
|---|---|---|
| GB | 916707 | 1/1963 |
| JP | 60-124423 A | 7/1985 |
| JP | 61-42444 A | 2/1986 |
| JP | 3-106521 A | 5/1991 |
| JP | 11-120743 | 4/1999 |
| JP | 11-120743 A * | 4/1999 |

(Continued)

OTHER PUBLICATIONS

European Search Report Mailed Jan. 8, 2004.

(Continued)

*Primary Examiner*—Kiley Stoner
(74) *Attorney, Agent, or Firm*—Crowell & Moring LLP (57) ABSTRACT

The disclosure is concerned with a bonding method for bonding metallic members, which comprises the steps of: fitting a metallic members to another metallic member, followed by effecting preliminarily plastic bonding by means of a preliminarily bonding punch; and generating compression force in an axial direction of the members in the vicinity of the fitting portion of the bonding members after the preliminarily plastic bonding, and allowing part of the material of the bonding member to effect plastic-flow in such a manner as to fill a gap defined between the metallic members, so as to plastically bond the members; whereby the members are tightly integrated with each other.

15 Claims, 12 Drawing Sheets

FOREIGN PATENT DOCUMENTS

| | | | |
|---|---|---|---|
| JP | 11120743 | | 4/1999 |
| JP | 11120743 A | * | 4/1999 |
| JP | 2000-170858 A | | 6/2000 |
| JP | 2001-054268 | | 2/2001 |
| JP | 2001-54268 A | * | 2/2001 |
| JP | 2001054268 A | * | 2/2001 |

OTHER PUBLICATIONS

Outline for Reasons of Rejection for Japanese Office Action dated May 16, 2008 (Three (3) Pages).

* cited by examiner

METHOD OF BONDING METALLIC MEMBERS BY PLASTIC-FLOW BONDING AND PLASTIC-FLOW BONDED BODY

DETAILED DESCRIPTION OF THE INVENTION

1. Technical Field to Which the Invention Pertains

The present invention relates to a method of bonding metallic members by plastic-flow bonding, and a bonded body obtained by the method.

2. Related Art

Conventional methods for fitting metallic members to each other and subjecting them by plastic-flow bonding include a method for subjecting two members to plastic-flow bonding in a gap-fitting state (for example, refer to Japanese Patent Laid-open No. 11-120743, page 4 and FIGS. 3 and 4).

Furthermore, another method for fitting two metallic members to each other includes a method of subjecting them to plastic-flow bonding in a press-fitting state (for example, refer to Japanese Patent Laid-open No. 2001-54268, page 2 and FIG. 1).

In a bonding method disclosed in Patent Laid-open No. 11-120743, since plastic-flow bonding is performed after metallic members are free-fitted with a gap to each other, a portion other than the vicinity of a portion which is pressed to effect plastic-flow forms a gap, as a matter of fact, which leads to relatively weak bonding strength, especially, bending strength. In particular, a problem will arise in the case where thin metal plate members are pressed to effect plastic-flow for bonding.

In a bonding method disclosed in Japanese Patent Laid-open No. 2001-54268, since plastic-flow bonding is performed after two members are press-fitted to each other, there is no gap at a portion other than the vicinity of a portion which is pressed to effect plastic-flow, and therefore, high bonding strength, in particular, high bending strength can be achieved. However, a scrape or a gall tends to occur in the two members at the time of the press-fitting, thereby bringing about occurrence of bending due to the press-fitting or contamination. Moreover, high precision in shape of the bonding members is needed to manage a press-fitting margin, thereby increasing a cost.

SUMMARY OF THE INVENTION

An object of the present invention is to provide, at a low cost, a method for plastic-flow bonding with high bonding strength and high accuracy, which eliminates any occurrence of contamination.

The present invention provides a method of bonding metallic members by a plastic flow bonding to produce a bonded body with an increased bonding strength and free from contamination.

The present invention further provides a plastic flow bonded metallic body with a high bonding strength and free of contamination. The bonded body can be applied especially to an apparatus for rotating a rotating disc and a rotating shaft, the members being bonded to each other.

The present invention provides a bonding method for bonding metallic members, which comprises the steps of: fitting a metallic members to another metallic member, followed by effecting preliminarily plastic bonding by means of a preliminarily bonding punch; and generating compression force in an axial direction of the members in the vicinity of the fitting portion of the bonding members after the preliminarily plastic bonding, and allowing part of the material of the bonding members to effect plastic-flow in such a manner as to fill a gap defined between the metallic members, so as to plastically bond the members; whereby the members are tightly integrated with each other.

DETAILED DESCRIPTION OF THE PREFERRED EMBODIMENTS

The present invention is applied to a bonding method for bonding a bonding member to a member to be bonded, which are used for a device for rotating the bonding member serving as a rotary disk and the member to be bonded serving as a rotary shaft integrally connected to each other.

The method comprises the steps of:

inserting the member to be bonded into a fitting hole formed in the bonding member having an inner diameter greater than an outer diameter of the member to be bonded, followed by positioning the member to be bonded;

pressurizing a portion, in the vicinity of the fitting portion of the member to be bonded, of the bonding member at a load for generating a stress enough to effect plastically deform the material of the bonding member, to effect preliminarily plastic bonding;

further pressurizing the portion, in the vicinity of the fitting portion of the member to be bonded, of the bonding member at a load in excess of an elastic limit of the material of the bonding member; and generating compression force in an axial direction of the member to be bonded at the portion in the vicinity of the fitting portion of the bonding member, and then, allowing part of the material of the fitting portion in excess of the elastic limit to effect plastic-flow in such a manner as to fill a gap defined between the member to be bonded and the bonding member;

whereby the bonding member and the member to be bonded are tightly integrated with each other.

The present invention is also applied to a bonded body comprising a bonding member and a member to be bonded, which are used in a device for rotating the bonding member on which rotary disks are stacked and the member to be bonded serving as a rotary shaft in integral bonding:

wherein a portion, in the vicinity of the fitting portion of the member to be bonded, of the bonding member is pressurized at a load for generating a stress enough to plastically deform the material of the bonding member, followed by preliminarily plastic bonding;

further the portion, in the vicinity of the fitting portion of the member to be bonded, of the bonding member is pressurized at a load in excess of an elastic limit of the material of the bonding member; and a compression force in an axial direction of the to-be-bonded member is generated at the portion in the vicinity of the fitting portion of the bonding member, and then, part of the material of the fitting portion in excess of the elastic limit is allowed to plastic-flow in such a manner as to fill a clearance defined between the member to be bonded and the bonding member;

whereby the bonding member and the member to be bonded are tightly integrated with each other.

The present invention is further applied to a mechanical apparatus provided with a bonded body comprising a bonding member and a member to be bonded, which are used in a device for rotating the bonding member on which rotary disks are stacked and the to-be-bonded member serving as a rotary shaft in integral bonding:

wherein a portion, in the vicinity of the fitting portion of the to-be-plastically deformed part, which is in the vicinity of the fitting portion the to-be-bonded member and is further pressed, to effect flow bonding.

The technical fields to which the present invention is applied are a bonding method for subjecting, to plastic-flow bonding, metallic members such as a shaft and a hub in a spindle motor for use in a disk device, a DVD or a CD-ROM in a computer or the like, in particular, in a spindle motor having a dynamic pressure bearing structure, which is a thin-type hard disk drive motor to be loaded in a portable personal computer such as a notebook personal computer. In addition, it relates to a bonded body with reference to FIGS. 1 to 15. For the convenience, there are set forth meanings of all reference numerals in the following table.

TABLE

| 1 | Shaft |
|---|---|
| 2 | Hub |
| 3 | Disc |
| 4 | Disc spacer |
| 5 | Clamp |
| 6 | Screw |
| 7 | Housing |
| 8 | Dynamic pressure bearing metal |
| 10 | Thrust receiving plate |
| 11 | Base |
| 12 | Stopper ring |
| 13 | Magnet |
| 14 | Stator core |
| 21 | Bonding hole |
| 22 | Edge portion |
| 23 | Bottom face |

TABLE-continued

| 25 | Outer diameter of hub |
|---|---|
| 24 | Flange |
| 31 | Annular groove |
| 32 | Female screw |
| 34 | Edge portion |
| 40 | Spherical edge portion |
| 41 | Thrust receiving face |
| 42 | Stopper groove |
| 60 | Preliminary bonding punch |
| 61 | Guide ring |
| 62 | Inner diameter |
| 63 | Stand |
| 64 | Guide hole |
| 65 | Inner diameter of guide ring |
| 66 | Preliminary bonding projection |
| 67 | Screw hole |
| 70 | Punch |
| 71 | Preliminary bonding mark |
| 72 | Bottom portion of preliminary mark |
| 74 | Guide hole |
| 76 | Bonding projection |
| 80 | Preliminary bonded body |
| 100 | Dynamic pressure bearing spindle motor |
| 200 | Hard disc |
| 300 | Read-out device |

The bonding method for subjecting the two members to the plastic-flow bonding and the bonded body according to the present invention are exemplified here in a dynamic pressure bearing spindle motor in a hard disk drive by the use of a bonded body including a hub and a shaft in a preferred embodiment.

Figure 1:
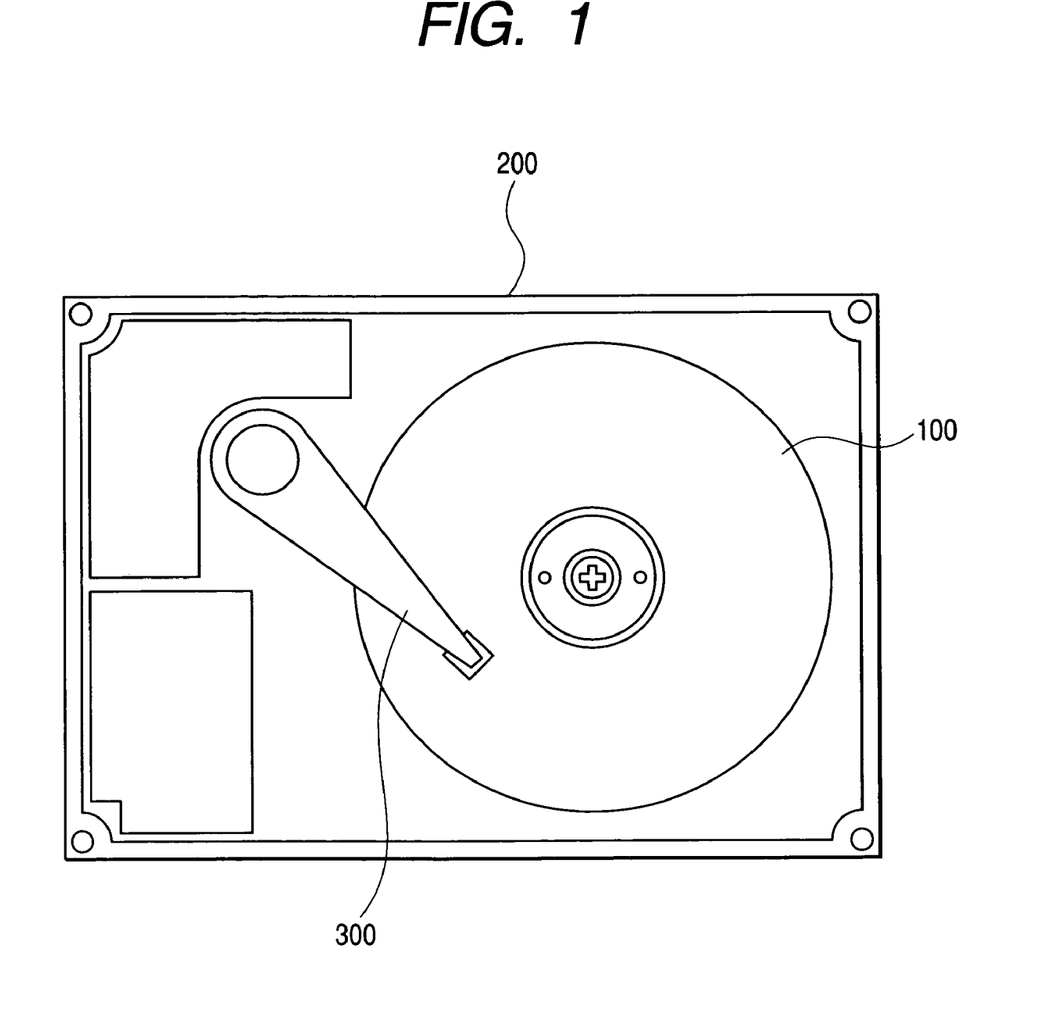
FIG. 1 is a general plan view of a hard disk drive to which the present invention is applied.
Figure 2:
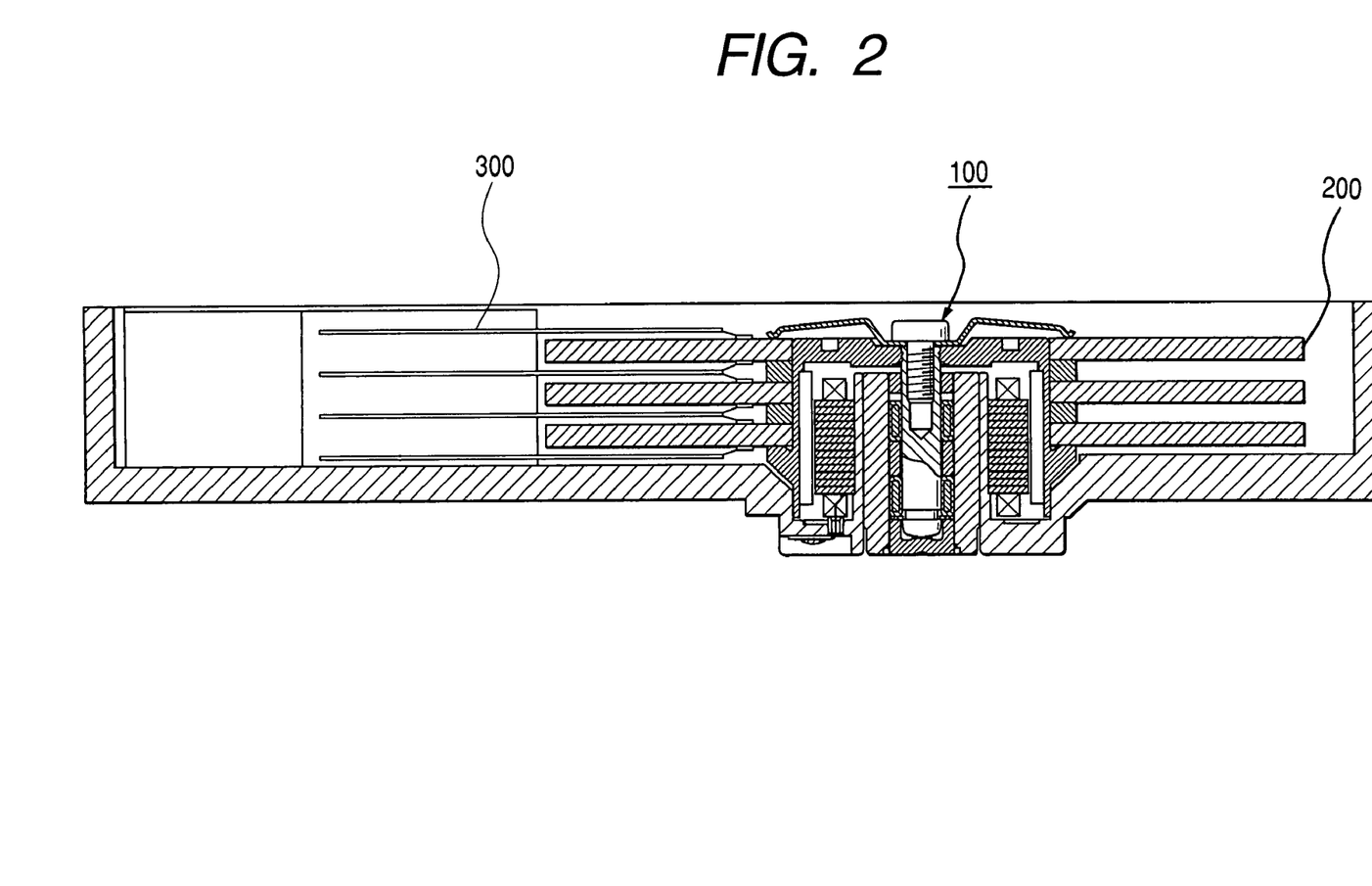
FIG. 2 is a vertical cross-sectional view of the hard disk drive shown in FIG. 1.

FIG. 1 is a general plan view of a hard disk drive, and FIG. 2 is a cross-sectional view of the hard disk drive shown in FIG. 1.

In FIGS. 1 and 2, reference numeral 200 designates a hard disk of a hard disk drive (abbreviated as "an HDD"), in which a dynamic pressure bearing spindle motor 100 is disposed. A read-out device 300 reads out data from a hard disk rotationally driven by the dynamic pressure bearing spindle motor 100.

Figure 3:
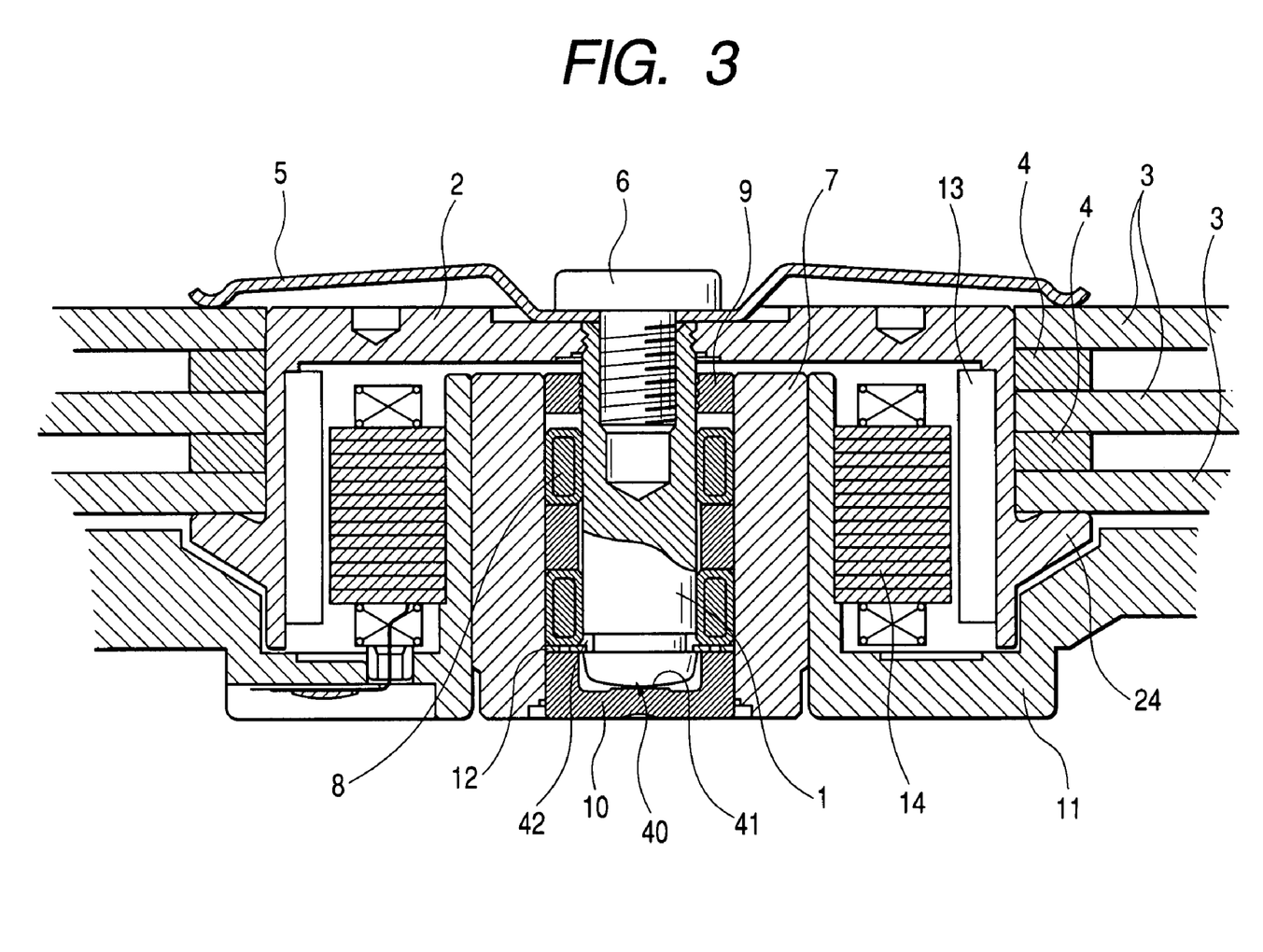
FIG. 3 is an enlarged cross-sectional view of a dynamic pressure bearing spindle motor, using a bonded body of a hub and a shaft, in the hard disk drive shown in FIG. 2.

FIG. 3 shows a dynamic pressure-bearing spindle motor in the hard disk drive, in which a bonded body of a hub and a shaft is used, in a preferred embodiment according to the present invention.

In FIG. 3, a shaft 1 is integrated with a hub 2 by a bonding method according to the present invention. To the hub 2 is securely fixed a magnet 13. A plurality of disks 3 serving as storage mediums are stacked on a flange 24 of the hub with disk spacers 4 held therebetween and are secured by a clamp 5 that is tightened to a female screw 32 of the shaft 1 with a screw 6. The shaft 1 is rotatably fitted into the bore of a dynamic pressure bearing metal 8 secured to a housing 7. Thus, a radial dynamic pressure bearing is constituted by the effect of a dynamic pressure generated by a magnetic fluid filled inside the housing according to rotation. The housing 7 is fixedly secured to a base 11. A thrust receiving plate 10 is joined to the housing 7 while a stopper ring 12 is held between the dynamic pressure bearing metal 8 and the thrust receiving plate 10, and thus, constitutes a thrust bearing in which a spherical edge portion 40 of the shaft 1 is supported at a thrust receiving face 41: The shaft 1 is suppressed by the stopper ring 12 fitted into a stopper groove 42 from floating in a thrust direction. A wound stator core 14 is securely bonded to the base 11 with an adhesive, and therefore, the magnet 13 receives rotating force at the time of energization, thereby rotating the hub 2.

Next, an explanation will below be made of the hub 2 and the shaft 1. It is desirable that the hub 2 as a bonding member should be made of a material which is liable to plastically deform and has deformation resistance is smaller than that of the shaft 1 serving as a member to be bonded. The hub 2 is made of ferrite stainless steel, for example, SUS430 in consideration of corrosion resistance and magnetic characteristics in terms of a motor. The shaft 1 is formed into a columnar shape, and is made of martensitic stainless steel excellent in abrasion resistance or corrosion resistance such as SUS440 or SUS420 J2 in consideration of bearing performance, followed by hardening. At an outer diameter portion to be bonded in the vicinity of one end of the shaft 1 is formed an annular groove 31. The details of the shape of the groove will be described later.

Figure 4:
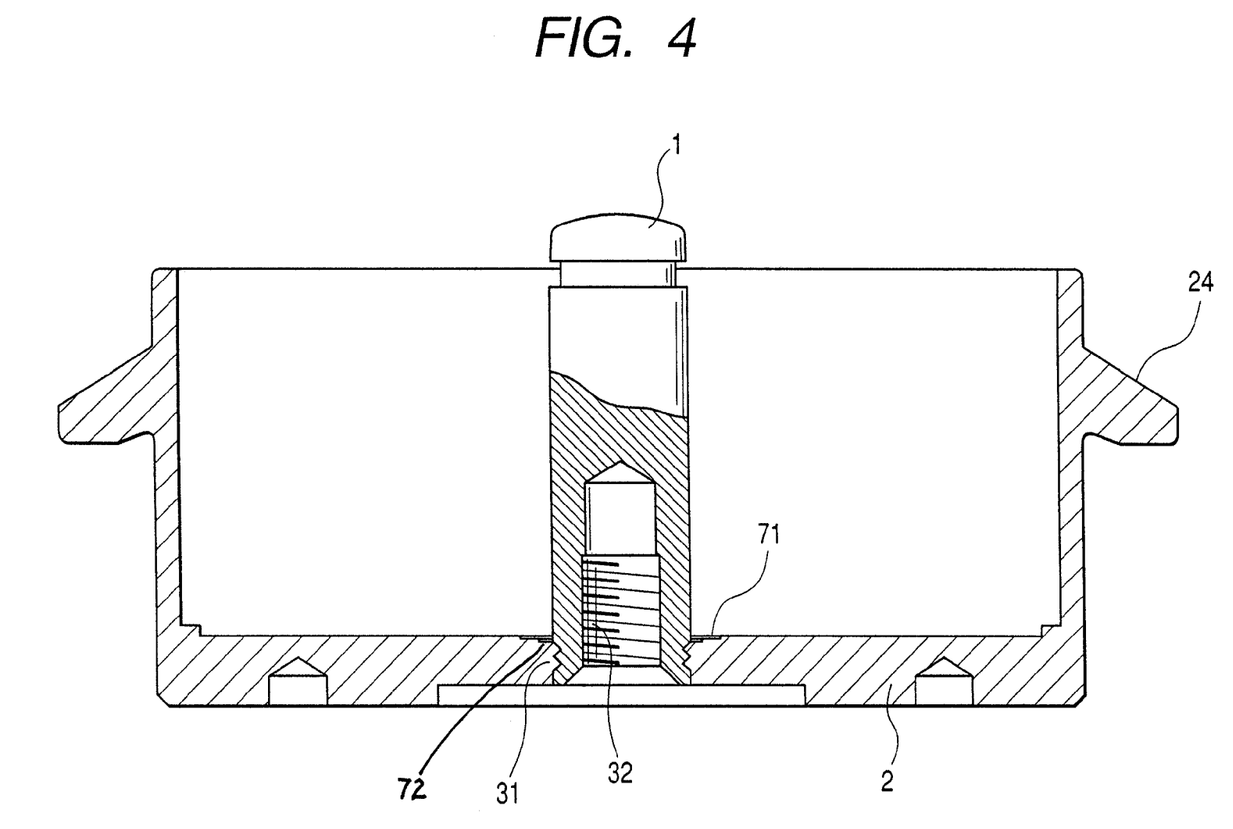
FIG. 4 is a vertical cross-sectional view of the bonded body of the hub and the shaft.
Figure 5:
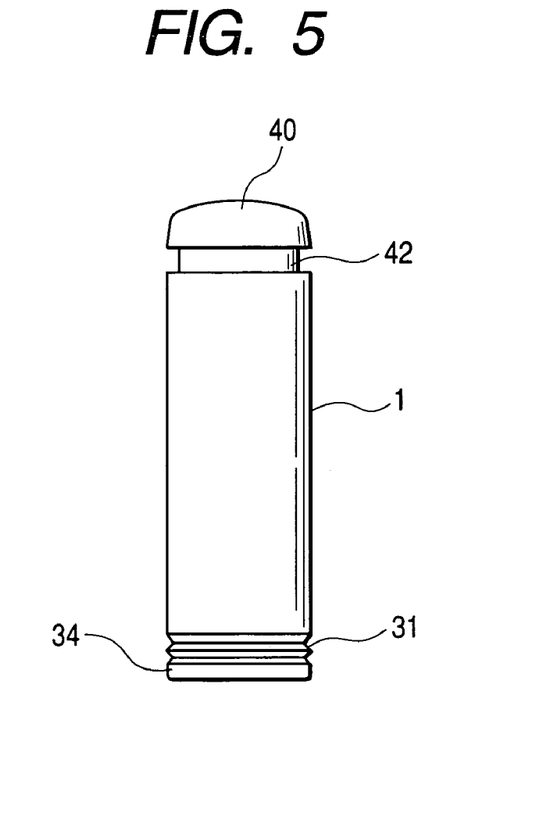
FIG. 5 is a side view of the shaft.
Figure 6:
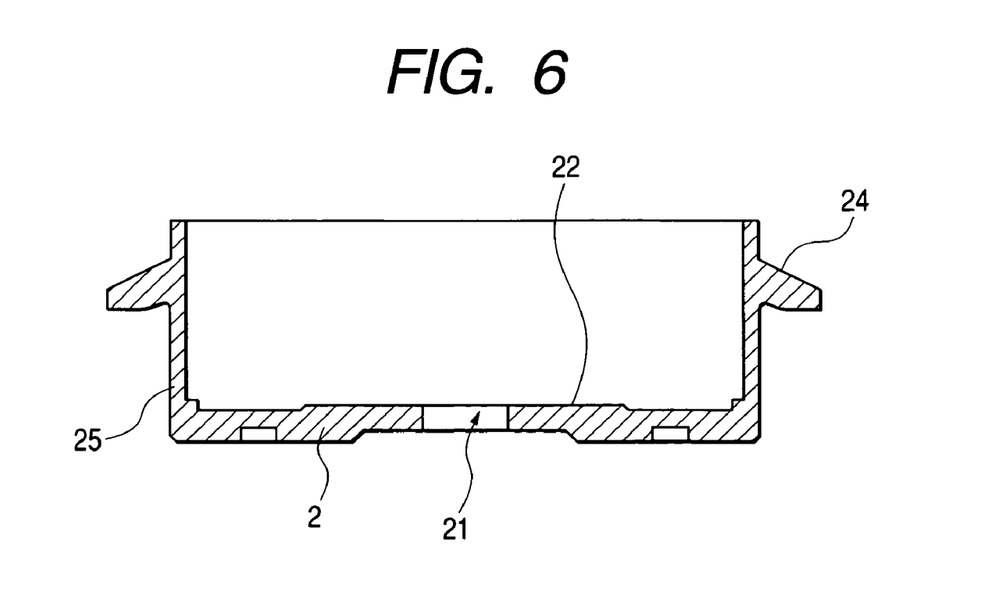
FIG. 6 is a vertical cross-sectional view of the hub.

FIG. 4 shows a bonded body of the hub and the shaft in a preferred embodiment according to the present invention. In FIG. 4, the shaft 1 is provided with the annular groove 31 formed in the outer diameter portion to be bonded in the vicinity of one end of the shaft 1 and is plastically bonded to a bonding hole 21 formed in the hub 2 having a diameter greater than the outer diameter of the shaft 1 by a method, described below, as shown in FIG. 6. The shaft 1 and the hub 2 are bonded to each other through a first process in which the shaft 1 shown in FIG. 5 is freely fitted or gap-fitted to the hub 2 shown in FIG. 6, followed by preliminarily plastic bonding, and a second process of plastic-flow bonding.

Figure 7:
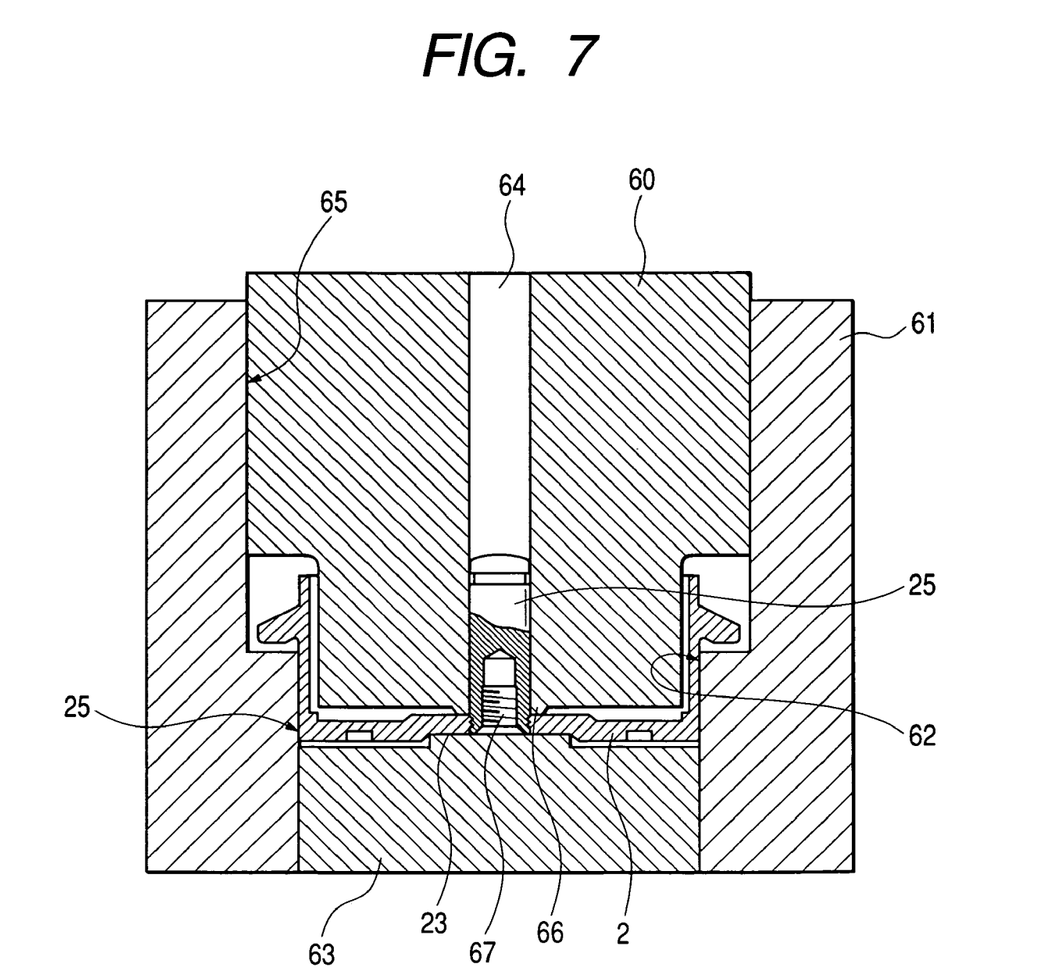
FIG. 7 is a vertical cross-sectional view of a molding die used in a process of preliminarily plastic bonding.

First, a description of the first process of the preliminarily plastic bonding will be given below. A bottom face 23 of the hub 2 is held by a stand 63, as shown in FIG. 7. The hub 2 is held at an outer diameter 25 thereof by an inner diameter 62 of a guide ring 61. Thereafter, an edge portion 34 on a side on which the annular groove 31 is formed at the outer diameter portion to be bonded of the shaft 1 is inserted into and fitted to the bonding hole 21 of the hub 2.

It is desirable from the viewpoint of bonding accuracy that a clearance or gap at the fitting portion between the shaft 1 and the hub 2 when the edge portion 34 of the shaft 1 is inserted into the bonding hole 21 of the hub 2, that is, a clearance between the wall surface of the bonding hole 21 of the hub 2 and the outer peripheral surface of the shaft 1 should be set as small as 0 to 0.02 mm. In the present preferred embodiment, the outer diameter of the shaft 1 is set to 3.00 mm while the inner diameter of the bonding hole 21 of the hub 2 is set to 3.01 mm.

In this manner, while the bottom surface 23 of the hub 2 is held by the stand 63, the edge portion 34 of the shaft 1 is inserted into and fitted to the bonding hole 21 of the hub 2. Thus, a preliminarily bonding punch 60 is fitted to the inner circumference 65 of the guide ring 61 and the shaft 1 is fitted into a guide hole 64 formed at substantially the center of the preliminarily bonding punch 60, thereby holding the shaft 1. The shaft 1 is held in the guide hole 64 of the preliminarily bonding punch 60 guided on the inner circumference 65 of the guide ring 61, and then, the preliminarily bonding punch 60 is driven by a press ram, not shown into the bonding member. When the preliminarily bonding punch 60 is driven by the press ram, a ring-like projection 66 having a projection width K is formed at the tip of the preliminarily bonding punch 60 by which an edge portion 22 of the hub 2 is pressed down in the vicinity of the bonding hole 21.

Figure 8:
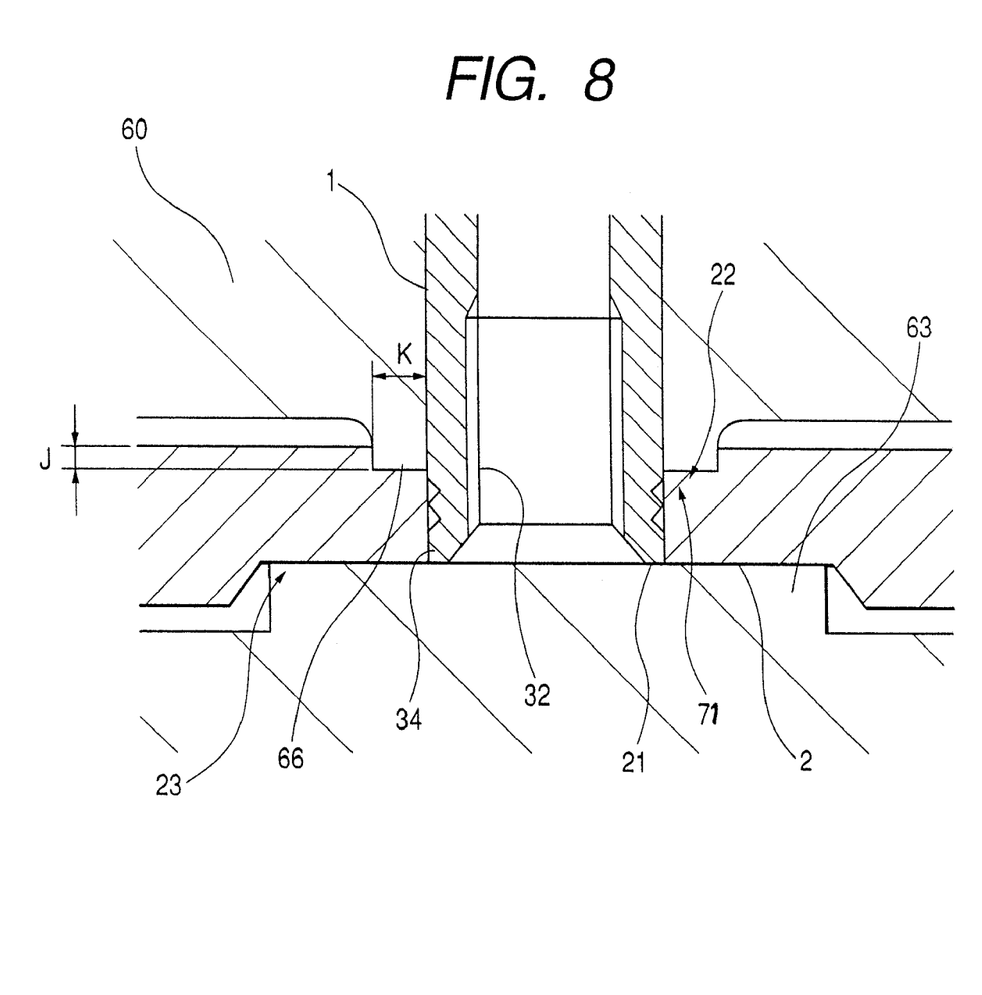
FIG. 8 is an enlarged vertical cross-sectional view of a bonded portion of the shaft and the hub after completion of the preliminarily plastic bonding.

The pressing force of the preliminarily bonding punch 60 is a load that generates stress large enough to plastic-deform the material forming the hub 2, and force that plastically deforms a portion corresponding to such a depth as to fill the fitting clearance between the shaft 1 and the hub 2 vertically. The preliminarily bonding punch 60 is pressed down at the above-described load, and then, the material in the vicinity of the bonding hole 21 of the hub 2 is allowed to plastic-flow, to effect the preliminary bonding. The bonding portion after the preliminarily plastic bonding in the above-described manner is shown in FIG. 8, which is an enlarged vertical cross-sectional view.

Subsequently, an explanation will below be made of the second process of the plastic-flow bonding. In the second process shown in FIG. 9, a preliminary bonded body 80 of the shaft 1 and the hub 2 which have been subjected to the preliminarily plastic bonding is held by the stand 63 at the bottom face 23 of the hub 2, and the outer diameter 25 of the hub 2 is held by the inner diameter 62 of the guide ring 61. Then, the shaft 1 is held in a guide hole 74 formed in a punch 70 guided on the inner diameter 65 of the guide ring 61. In this state, a press ram, not shown, drives the punch 70 into the bonding member. When the punch 70 is driven into the bonding member, a ring-like bonding projection 76 presses a portion of the bottom portion 72 of a preliminarily bonding mark 71 in the vicinity of the bonding hole 21. The ring-like bonding projection 76 is disposed at the tip of the punch 70 and has a projection width W smaller than the projection width K of the preliminarily bonding projection 66 of the preliminarily bonding punch 60.

Figure 9:
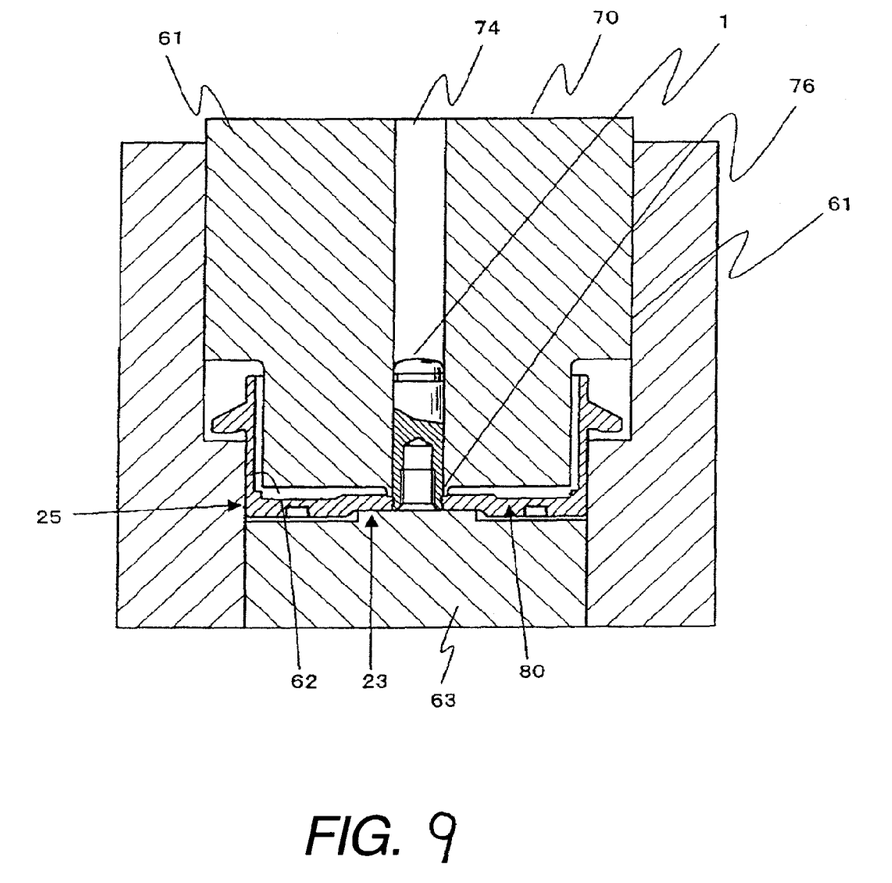
FIG. 9 is a vertical cross-sectional view of a molding die used in a process of plastic-flow bonding.
Figure 10:
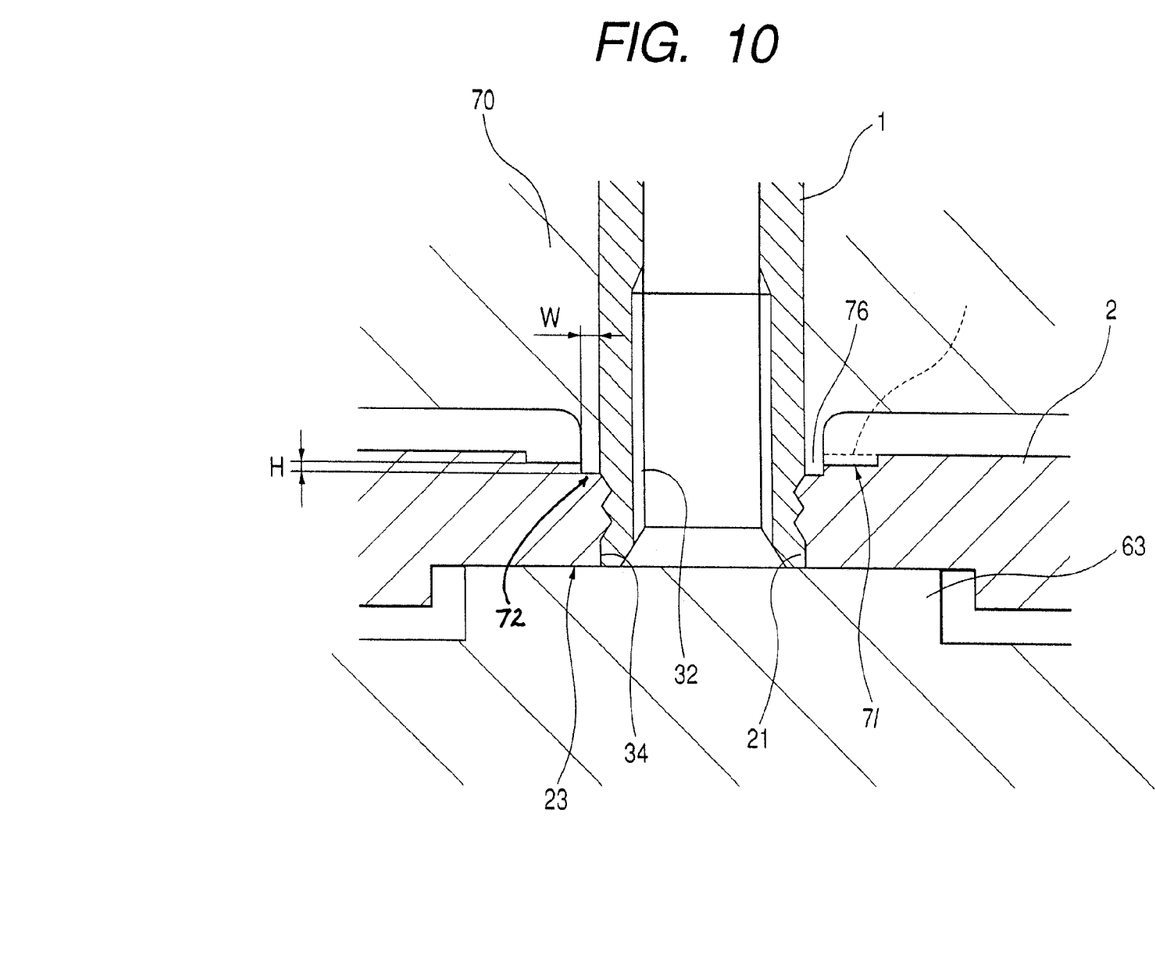
FIG. 10 is an enlarged vertical cross-sectional view of the bonded portion of the shaft and the hub after the completion of the plastic-flow bonding.

The pressing force of the punch 70 is a load large enough to generate a stress for effecting a plastic deformation of the material forming the hub 2. The punch 70 is pressed down at the above-described load, and then, the material in the vicinity of the bonding hole 21 of the hub 2 is allowed to effect plastic-flow over the entire circumference of the groove 31, followed by the bonding. The bonded portion after the plastic-flow bonding in the above-described manner is shown in FIG. 10, which is an enlarged vertical cross-sectional view of the bonding.

Furthermore, in order to achieve a high bonding accuracy, the smaller the gap between the guide hole 64 of the preliminarily bonding punch 60 or the guide hole 74 of the punch 70 and the outer peripheral surface of the shaft 1, the higher the bonding accuracy is obtained. Moreover, if the projecting width K and pressing depth J due to the preliminarily bonding projection 66 of the preliminarily bonding punch 60 are too large, the load for effecting the plastic deformation becomes large, thereby degrading the accuracy of the hub 2.

Additionally, if the projecting width W and pressing depth H due to the bonding projection 76 of the punch 70 are too great, the load for the plastic deformation becomes large, and therefore, the material more than that flowing in the groove is liable to be fluidized, thereby degrading the bonding accuracy. Thus, the projecting width W and the pressing depth H are set according to the shape of the groove.

Figure 11:
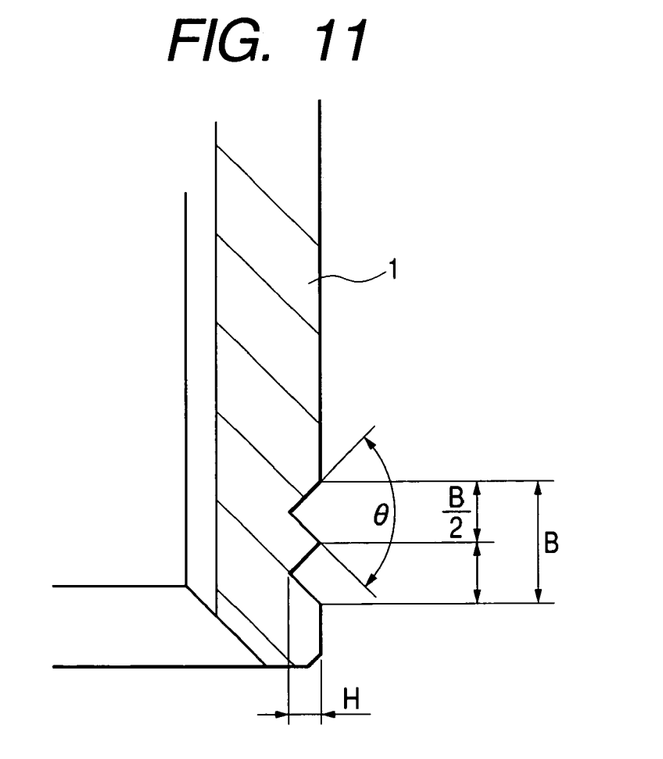
FIG. 11 is an enlarged vertical cross-sectional view of a groove of the shaft.

Next, a description will be given below of the shape of the groove 31 of the shaft 1. FIG. 11 shows one example of the portion of the groove 31 of the shaft 1. Factors determining the cross-sectional shape of the groove 31 of the shaft 1 include the groove depth H, a groove width B, a groove angle e, the number n of grooves and the like.

If the depth H of the groove 31 of the shaft 1 is too small, a sufficient shearing strength cannot be achieved due to easy plastic deformation when external force is exerted in an axial direction. In contrast, if the depth H of the groove 31 of the shaft 1 is too large, the material insufficiently flows into the groove, thereby forming a gap, so as to degrade the strength. As shown in FIG. 7, the screw hole 67 for screwing the clamp 5 is formed at the lower portion of the shaft 1, and further, the female screw 32 is disposed at the inner wall surface of the screw hole 67 of the shaft 1. Consequently, the thickness at a portion near the bonded portion of the hub 2 to the lower portion of the shaft 1 becomes small. Therefore, if the depth H of the groove 31 of the shaft 1 shown in FIG. 11 is increased, the strength of the shaft 1 is degraded. Thus, the groove depth H of the groove 31 of the shaft 1 should desirably range from about 0.07 to about 0.13 mm.

The width B of the groove 31 of the shaft 1 can be varied according to the shearing strength required at the bonded portion. However, if the width is set too largely, a distance from the tip of the punch 70 to the lower portion of the groove 31 of the shaft 1 becomes great in bonding to the hub 2, thereby increasing a fluid frictional loss of the material in the vicinity of the bonding hole 21 of the hub 2, which should flow into the groove 31 of the shaft 1. Therefore, even if the large load is applied to the hub 2 by the punch 70, the internal stress of the material in the vicinity of the bonding hole 21 of the hub 2 near the lower portion of the shaft 1 cannot be increased enough to achieve the plastic deformation. As a consequence, the material in the vicinity of the bonding hole 21 of the hub 2 near the lower portion of the shaft 1 is reduced in quantity of the plastic deformation, so that the material in the vicinity of the bonding hole 21 of the hub 2 insufficiently flows into the groove 31 of the shaft 1. In this manner, if the depth H of the groove 31 of the shaft 1 shown in FIG. 11 is increased, the strength of the shaft 1 is degraded. Thus, the depth H of the groove 31 of the shaft 1 should desirably range from about 0.07 to about 0.13 mm.

Moreover, as shown in FIG. 11, as to the groove angle $\theta$ representing an opening degree (i.e., an angle) of the groove 31 of the shaft 1, if the opening angle $\theta$ of the groove 31 of the shaft 1 is small, the material in the vicinity of the bonding hole 21 of the hub 2 is less prone to flow into the groove 31 of the shaft 1 when the large load is applied to the hub 2 by the punch 70. In contrast, if the opening angle $\theta$ of the groove 31 of the shaft 1 is great, the material in the vicinity of the bonding hole 21 of the hub 2 shallowly bites when the large load is applied to the hub 2 by the punch 70, so that drawing strength becomes small. In this manner, if the groove angle $\theta$ of the groove 31 of the shaft 1 shown in FIG. 11 is small, the material is less prone to flow into the groove 31 of the shaft 1; in contrast, if the groove angle $\theta$ of the groove 31 of the shaft 1 is large, the drawing strength becomes small. As a result, the groove angle $\theta$ of the groove 31 of the shaft 1 should desirably range from about 60° to about 120°.

Furthermore, as the number n of grooves 31 of the shaft 1 is greater, the contact area between the shaft 1 and the hub 2 becomes larger, thereby increasing the drawing strength. However, if the number n of grooves 31 of the shaft 1 is great, the material in the vicinity of the bonding hole 21 of the hub 2 is less prone to flow into the groove 31 of the shaft 1 when the large load is applied to the hub 2 by the punch 70. As a consequence, if the number n of grooves 31 of the shaft 1 is too great, the drawing strength is much degraded. Thus, when the number n of grooves 31 of the shaft 1 is 2, the drawing strength is highest. Upon comparison of the case of n=1 with the case of n=2 under the condition that the groove width B is the same, the contact area between the shaft and the hub is greater in the case of n=2, thereby increasing the drawing strength.

Figure 12:
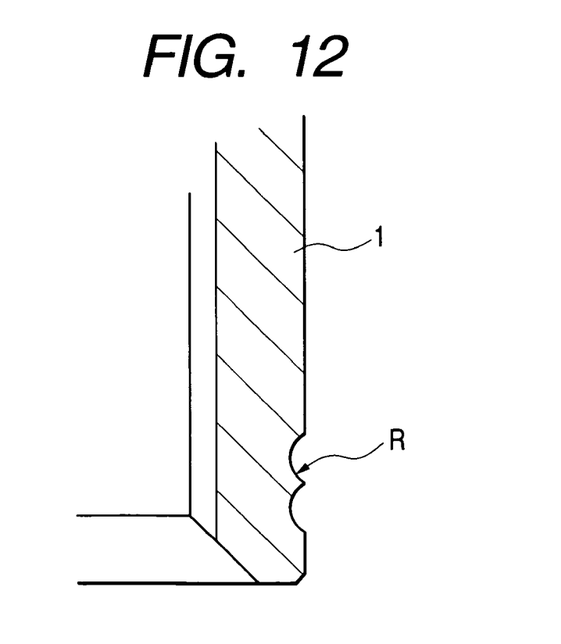
FIG. 12 is an enlarged vertical cross-sectional view of a round groove of the shaft.
Figure 13:
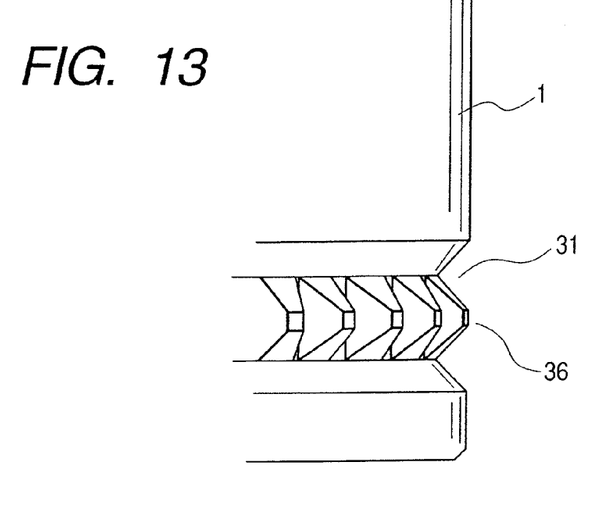
FIG. 13 is an enlarged view showing a groove having a knurl at the shaft.

Incidentally, the cross-sectional shape of the groove 31 of the shaft 1 need not be a triangle as shown in FIG. 11. It may be a round shape, as shown in FIG. 12. In the case where a high torque strength is needed at the bonded portion between the lower portion of the shaft 1 and the hub 2, a knurl 36 may be formed at a thread between the grooves 31 of the shaft 1, as shown in FIG. 13.

Additionally, if the groove 31 of the shaft 1 is formed over the entire circumference of the shaft 1, the material in the vicinity of the bonding hole 21 of the hub 2 plastically flows over the entire circumference in a uniform manner when the large load is applied to the hub 2 by the punch 70, and further, strain also uniformly is exerted over the entire circumference, so that both of accuracy of a right angle and strength can be enhanced. In addition, the groove 31 of the shaft 1 can be molded by lathing, thus achieving high productivity.

Furthermore, it is preferable that the position of the groove 31 of the shaft 1 should be set near a pressing surface 24 of the hub 2 as possible. If the position of the groove 31 of the shaft 1 is positioned apart from the pressing surface 24 of the hub 2, a fluid frictional resistance becomes high, and therefore, the material in the vicinity of the bonding hole 21 of the hub 2 is prone to flow into the groove 31 of the shaft 1.

Figure 14:
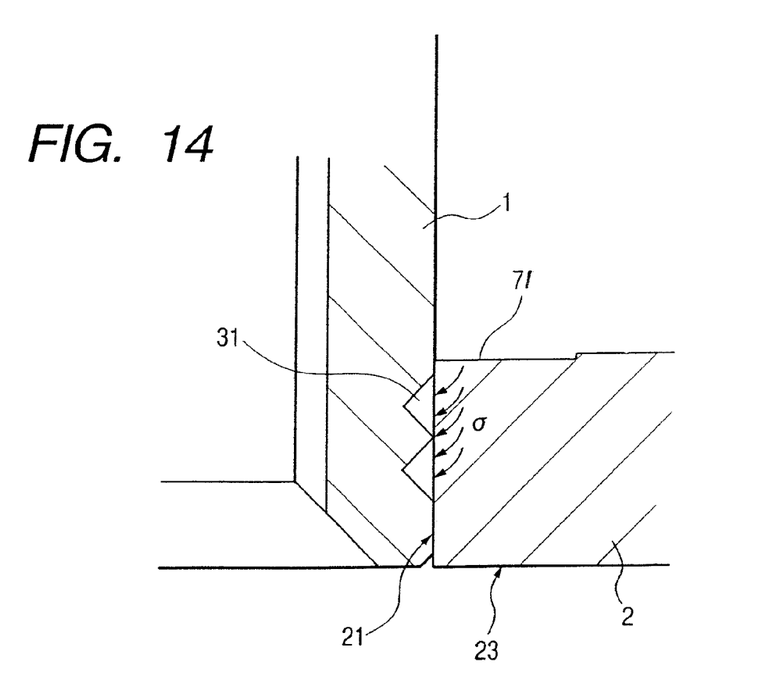
FIG. 14 is an enlarged vertical cross-sectional view of the bonded portion of the shaft and the hub, representing a stress after the completion of the preliminarily plastic bonding.
Figure 15:
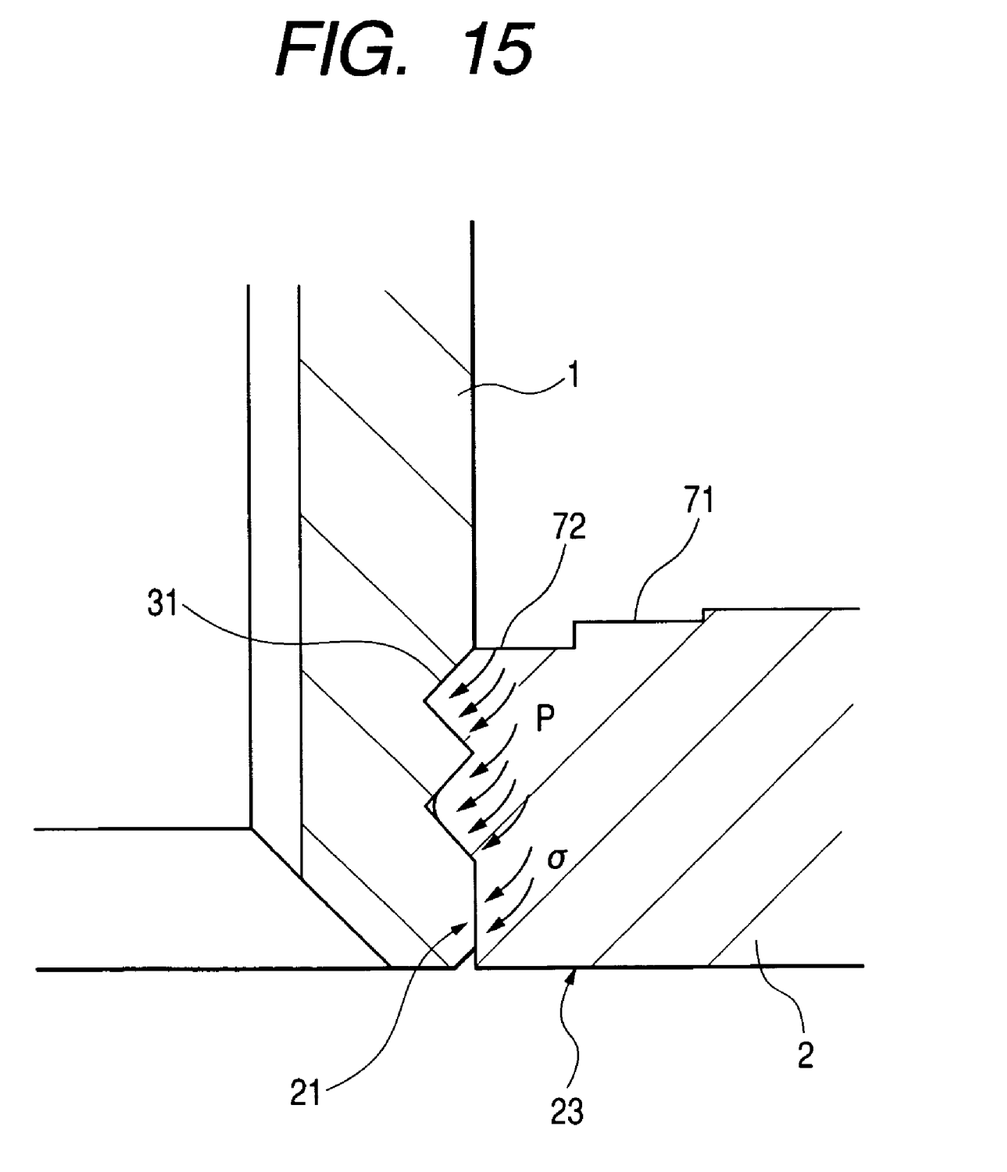
FIG. 15 is an enlarged vertical cross-sectional view of the bonded portion of the shaft and the hub, representing a stress after the completion of the plastic bonding.

In view of this, in the present preferred embodiment, as shown in FIG. 14, the outer circumferential portion of the shaft 1 having the annular groove 31 formed at the outer periphery of the shaft 1 is freely fitted into the bonding hole 21 of the hub 2; the large load is applied to the hub 2 by the punch 60; the vicinity of the hole formed at the end surface of the hub 2 is plastically deformed over the entire circumference; the shaft 1 and the bonding hole 21 of the hub 2 are subjected to the preliminarily plastic bonding in such a manner as to fill the gap; the material in the vicinity of the bonding hole 21 at the end surface is plastically deformed over the entire circumference after the preliminarily plastic bonding of the hub 2 in the state in which a stress $\sigma$ is exerted on the bonding hole 21 of the hub 2; a compression stress is exerted on the shaft 1 in such a manner as to fill the groove 31 of the shaft 1; and then, the material in the vicinity of the bonding hole 21 of the hub 2 is allowed to plastic-flow. The shearing force and strain P of the material in the vicinity of the bonding hole 21 of the hub 2 and the stress $\sigma$ caused by the preliminarily plastic bonding are exerted on a portion remote from the pressing portion, on which the strain is hardly exerted, as shown in FIG. 15. Thus, the connection strength between the hub 2 and the shaft 1 is high.

Incidentally, the present invention is not limited to the above-described preferred embodiment, but it can be applied to bonding between other members of various kinds of metals, for example, a shaft, a cylinder or the like and a flat plate.

According to the present invention, it is possible to achieve the sufficient strength and accuracy without any occurrence of bending or contamination even in the case of the bonding between the thin hub and the small-diameter shaft.

Moreover, the fitting accuracy before the bonding may be rough in comparison with the press-fitting, the high productivity can be achieved in inexpensive equipment, and further, the fabricating cost can be reduced.

What is claimed is:

1. A bonded body composed of a bonding member and a member to be bonded, which are used in a device for rotating the bonding member on which rotary disks are stacked, with the member to be bonded serving as a rotary shaft, wherein:

the bonding member has a bonding hole into which a fitting portion of the member to be bonded is insertable, with a first bonding mark, in the form of a first annular depression around the bonding hole, being formed on an axial face of the bonding member in a vicinity of the bonding hole, and a second bonding mark, in the form of a second annular depression around the bonding hole being formed at the bottom of the first bonding marks;

formation of the first bonding mark causes a flow of the material of the bonding member in the vicinity of the bonding hole towards the fitting portion of the member to be bonded, to integrate the member to be bonded and the bonding member, a portion of the bonding member in the vicinity of the fitting portion of the member to be bonded being pressurized at a load that is in excess of an elastic limit of the material of the bonding member, for generating a stress that is sufficient to plastically deform the material of the bonding member, to effect preliminary plastic bonding; and in formation of the second bonding mark, a compression force in an axial direction of the member to be bonded is applied to the portion of the bonding member in the vicinity of the the bonding hole, such that part of the material of the bonding member in the vicinity of the bonding hole is allowed to plastic-flow so as to fill a groove defined between the member to be bonded and the bonding member;

whereby the bonding member and the member to be bonded are tightly integrated with each other, with the first and second bonding marks remaining on the completed bonded body.

2. The bonded body as claimed in claim 1, wherein said groove is an annular groove provided at the fitting portion of the member to be bonded.

3. The bonded body as claimed in claim 2, wherein a knurl is formed as the annular groove at the fitting portion of the member to be bonded.

4. A mechanical apparatus provided with a bonded body composed of a bonding member and a member to be bonded, which are used in a device for rotating the bonding member on which rotary disks are stacked, with the member to be bonded serving as a rotary shaft; wherein an axial face portion of the bonding member in the vicinity of a fitting portion of the member to be bonded is pressed to provide a plastically deformed part, which is in the vicinity of the fitting portion of the member to be bonded, with a first bonding mark in the form of a first annular depression being formed in the vicinity of a bonding hole; and said axial face portion is further pressed, to effect plastic-flow bonding with a second bonding mark being formed in the form of a second annular depression at a bottom of the first bonding marks such that the first and second bonding marks remain.

5. An integrated bonded body, comprising:
a rotating shaft; and
a bonding member bondable to said rotating shaft; wherein,
the bonding member has a bonding hole into which the rotating shaft is insertable;
a first bonding mark, in the form of a first annular depression around the bonding hole, is formed on an axial face of the bonding member in a vicinity of the bonding hole;
a second bonding mark, in the form of a second annular depression around the bonding hole, is formed on an axial face at the bottom of the first bonding mark;
formation of the first bonding mark flows the material of the bonding member in the vicinity of the bonding hole towards the rotating shaft to integrate the rotating shaft and the bonding; member and;
the first and second bonding marks are present in the integrated bonded body.

6. The integrated bonded body according to claim 5, wherein:
an annular groove is formed around the rotating shaft at a bonding portion thereof; and
during formation of the first and second bonding marks, material of the bonding member in a vicinity of the bonding hole effects plastic flow towards the rotating shaft.

7. The integrated bonded body according to claim 6, wherein the rotating shaft has a plurality of said annular grooves.

8. The integrated bonded body according to claim 7, wherein the plurality of annular grooves constitutes two groves.

9. The integrated bonded body according to claim 6, wherein a cross sectional area of the grooves is of triangular shape.

10. The integrated bonded body according to claim 6, wherein a compression stress is exerted on the annular groove, and a stress is exerted on a portion of the rotating shaft other than the annular groove.

11. The integrated bonded body according to claim 6, wherein the bonding member has a deformation resistance smaller than that of the rotating shaft.

12. The integrated bonded body according to claim 6, wherein the annular groove is provided with a knurl.

13. An integrated bonded body, comprising:
a rotating shaft; and
a bonding member bondable to said rotating shaft; wherein,
the bonding member has a bonding hole into which the rotating shaft is insertable;
an annular first bonding mark is formed on an axial face of the bonding member around the bonding hole;
a second bonding mark is formed around the bonding hole, on an axial face at the bottom of the preliminary bonding marks;
formation of the first bonding mark flows the material of the bonding member in a vicinity of the bonding hole towards the rotating shaft to integrate the rotating shaft and the bonding member; and
the first and second bonding marks remain in the integrated bonded body.

14. A mechanical apparatus provided with an integrated bonded body, comprising:
a rotating shaft; and
a bonding member bondable to said rotating shaft; wherein
the bonding member has a bonding hole into which the rotating shaft is insertable;
a first bonding mark is formed in a vicinity of the bonding hole;
a second bonding mark is formed at the bottom of the preliminary bonding marks;
formation of the first bonding mark flows the material of the bonding member in the vicinity of the bonding hole towards the rotating shaft to integrate the rotating shaft and the bonding member; and
the first and second bonding marks remain in the integrated bonding body.

15. A bonded body comprising:
a first member; and
a second member; wherein,
said first member comprises a rotatable hub for supporting a plurality of rotating disks;
said second member comprises a shaft for rotating said first member, and is bonded to said first member by plastic bonding, wherein,
said first member has a bonding hole into which a fitting portion of the second member is insertable, with a gap between the second member and sides of the bonding hole;
a first bonding mark in the form of a first annular depression having a first diameter is formed around the bonding hole on an axial face of the first member;

a second bonding mark in the form of a second annular depression having a second diameter that is smaller than said first diameter, is formed around the bonding hole, in a bottom surface of said first bonding mark;

formation of the first bonding mark is performed by applying to the first member in the vicinity of the bonding hole, a stress that is sufficient to plastically deform the material of the first member, causing a plastic flow of said material of the first member in the vicinity of the bonding hole toward the fitting portion of the second bonding member, which plastic flow fills said gap along an entire axial extent thereof, forming a preliminary bond between said first and second members;

formation of said second bonding mark is performed by applying to said first member, at an inner portion of a bottom surface of said first bonding mark, a stress that is sufficient to cause a portion of the material of the first bonding member in the vicinity of the bonding hole to plastic flow, so as to fill a grooved formed in the fitting portion of the second member, between the first and second members; and whereby the first and second members are tightly integrated with each other to form the bonded body, with the first and second bonding marks remaining on the bonded body.

* * * * *